United States Patent
Duret

[19]

[11] Patent Number: 6,135,088

[45] Date of Patent: Oct. 24, 2000

[54] CONTROLLED SELF-IGNITION 4-STROKE ENGINE OPERATING PROCESS

[75] Inventor: Pierre Duret, Sartrouville, France

[73] Assignee: Institut Francais du Petrole, Cedex, France

[21] Appl. No.: 09/148,869

[22] Filed: Sep. 8, 1998

[30] Foreign Application Priority Data

Sep. 9, 1997 [FR] France ................................. 97/11279

[51] Int. Cl.[7] ................................................ F02B 17/00
[52] U.S. Cl. ................................. 123/430; 123/568.11
[58] Field of Search .................................. 123/430, 302, 123/306, 308, 568.11, 568.14, 568.17, 568.18

[56] References Cited

U.S. PATENT DOCUMENTS

| | | | |
|---|---|---|---|
| 4,119,071 | 10/1978 | Hattori | 123/568 |
| 4,289,094 | 9/1981 | Tanahashi | 123/433 |
| 4,413,593 | 11/1983 | Resler, Jr. | 123/430 |
| 4,433,667 | 2/1984 | Ripper | 123/569 |
| 4,732,124 | 3/1988 | Nakamura et al. | 123/430 |
| 5,379,743 | 1/1995 | Stokes et al. | 123/568.18 |
| 5,709,191 | 1/1998 | Monnier | 123/302 |
| 5,894,826 | 4/1999 | Jaye | 123/295 |

FOREIGN PATENT DOCUMENTS

| | | |
|---|---|---|
| 04214819 | 4/1991 | European Pat. Off. . |
| 0594463 | 4/1994 | European Pat. Off. . |
| 0719916 | 7/1996 | European Pat. Off. . |
| 9613655 | 5/1996 | WIPO . |
| 9720133 | 6/1997 | WIPO . |

*Primary Examiner*—Henry C. Yuen
*Assistant Examiner*—Hieu T. Vo
*Attorney, Agent, or Firm*—Antonelli, Terry, Stout & Kraus, LLP

[57] ABSTRACT

A method of operation of a four-stroke internal combustion engine having an intake, a combustion chamber coupled to the intake, an exhaust coupled to the combustion chamber and an exhaust recirculation device connecting the exhaust to the intake. The method includes admitting exhaust gas into the combustion chamber which is recirculated by the recirculation device from the exhaust into the intake. Thereafter, a mixture of air and fuel to be combusted is admitted through the intake into the combustion chamber which produces a stratification in the combustion chamber of the mixture of air and fuel and the exhaust gas. The stratified contents of the combustion chamber are then combusted by self-ignition.

27 Claims, 2 Drawing Sheets

CONTROLLED SELF-IGNITION 4-STROKE ENGINE OPERATING PROCESS

BACKGROUND OF THE INVENTION

1. Field of the Invention

The present invention relates to 4-stroke engines capable of working according to the self-ignition process and wherein the exhaust gas is recycled to the intake.

2. Description of the Prior Art

Self-ignition consists in using residual burned gases for initiating combustion in the combustion chamber itself. It is well-known that self-ignition is controlled via the amount of burned gases recycled and the combination thereof with the fuel mixture. The hot burned gases initiate combustion of the fuel mixture thanks to a specific combination of temperature and of active species (free radicals whose concentration reaches a critical value when self-ignition takes place).

It is well-known that combustion in this type of engines has advantages as regards emissions: low hydrocarbon emissions are obtained for two-stroke engines (40 to 80% decrease in relation to a conventional engine) and nitrogen oxides emissions can be decreased by up to 50%. For four-stroke engines, nitrogen oxides emissions can even be lower (close to ambient levels under certain conditions).

Furthermore, a remarkable combustion regularity is obtained with self-ignition running.

In two-stroke engines, the presence of residual gases (gases burned during the previous cycle or cycles) in the combustion chamber is inherent in the operation: in fact, when the load of the engine decreases, the amount of fresh gases decreases and is naturally replaced by an amount of residual gases. The two-stroke engine thus runs with an internal recirculation of burned gases, notably at partial load.

However, the presence of these burned gases in the combustion chamber is not sufficient to obtain the desired self-ignition running. Research work shows that the mixing of the residual gases and of the fresh gases has to be controlled and limited.

In adapting self-ignition technology for two-stroke engines to four-stroke engines, it is necessary to either increase the compression ratio considerably, or to heat up the engine notably, or to combine both phenomena.

French patent 2,738,594 describes a process which partially solves these problems by means of suitable additives in the fuel.

International application WO 93/16,276 discloses a variable distribution associated with a non-return system at the intake providing a decrease in pumping losses at partial load.

French patent application 97/02,822 filed by the assignee describes a self-ignition control in a four-stroke engine. More precisely, this document recommends, at partial load, to minimize mixing of the fresh gases with the burned gases confined in the combustion chamber (internal EGR) by delayingclosing of the exhaust as much as possible.

SUMMARY OF THE INVENTION

The present invention also aims to minimize, at partial load, mixing of the fresh gases with the burned gases contained in the combustion chamber in order to control and promote self-ignition combustion.

However, the present invention does not control the internal burned gases via exhaust control.

The present invention confines (at partial load) in the cylinder and the combustion chamber a large amount of burned gases recycled from the exhaust via an external specific pipe to the combustion chamber and then, according to the invention, to introduce a fresh feed of air-fuel mixture therein.

The present invention introduces fresh gases only when burned gases recycled from the exhaust (referred to as external EGR) are completely trapped in the combustion chamber, then introduces the fuel mixture as late as possible, i.e. preferably just before compression.

The present invention relates to a four-stroke internal-combustion engine operating process comprising controlled recycle of the burned gases to the intake allowing initiation of a self-ignition combustion by means of a pipe (referred to as external EGR pipe) connecting an exhaust pipe to at least one intake pipe.

The process according to the invention, at partial load, admits into the combustion chamber a large amount of burned gases (EGR) coming from the external EGR pipe, via a first intake, then admits into the combustion chamber a mixture of fresh air and fuel via a second intake, in order to obtain a stratification between the burned gases (EGR) and the mixture in the combustion chamber.

Admission of the fresh air-fuel mixture is preferably performed at the start of the compression stage.

More precisely, admission of the mixture can be performed at the end of and/or after the stage of admission of the burned gases.

According to the invention, the flow of recycled gas is controlled by a device placed either in the external EGR pipe or at the intersection thereof with at least one of the intake pipes.

According to another embodiment of the invention, the flow of air is controlled at the intake in order to decrease the velocity of the air entering the combustion chamber for certain working conditions of the engine.

Without departing from the scope of the invention, it is possible to use an EGR pipe whose shape imparts to the recycled gases a motion of rotation about the principal axis of the cylinder (a motion referred to as swirl).

Furthermore, the air of the mixture at the intake can be compressed.

According to an aspect of the invention, preparation of the air-fuel mixture is improved upstream from the intake by a specific device such as a venturi placed in the associated intake pipe, spraying of the mixture being thus improved.

Furthermore, the fuel can be injected at the level of the specific device.

According to a distinctive feature of the invention, the air-fuel mixture is diverted as soon as it enters the combustion chamber to the center of the combustion chamber.

The present invention also thermally insulates the recycled gases before they enter the intake pipe or pipes.

The fresh gases can thus be heated when their temperature is below a predetermined value before they are introduced into the combustion chamber.

Furthermore, the flow rate of the exhaust gases can be controlled.

The EGR pipe can open, on the exhaust side, downstream from a device intended for exhaust gas processing. It is thus possible to take advantage of the conversion of the polluting gases by the processing device to heat the burned gases used by the EGR.

Rotary plugs can be used as intake and/or as an exhaust.

Without departing from the scope of the invention, valves can also be used as the intake and/or as the exhaust.

Backflow of part of the mixture confined in at least one of the intake means is thus prevented by placing a device such as a non-return valve in the intake pipe.

BRIEF DESCRIPTION OF THE DRAWINGS

Other features, advantages and details of the present invention will be clear from reading the description hereafter, given by way of non limitative example, with reference to the accompanying drawings wherein.

DESCRIPTION OF THE PREFERRED EMBODIMENTS

Figure 1:
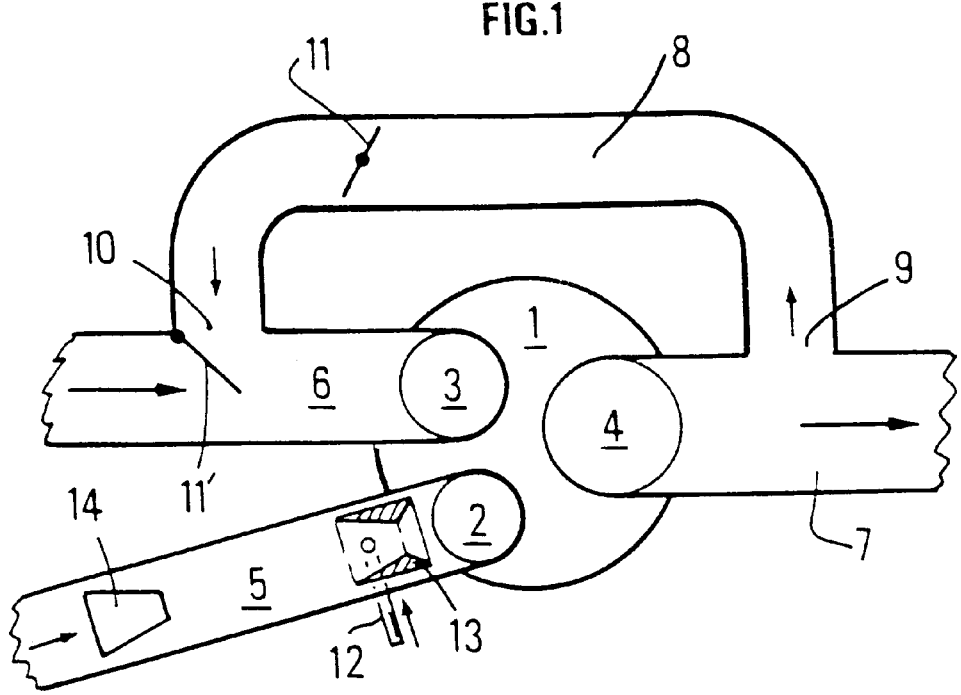
FIG. 1 is a simplified cross-section of a four-stroke engine working according to an embodiment of the invention.

FIG. 1 shows the main elements for operating a four-stroke engine according to one of the embodiments of the invention.

A combustion chamber 1 of the engine has two intake ports 2, 3 and an exhaust port 4. An intake pipe 5, 6 and an exhaust pipe 7 respectively open into each of the ports.

According to FIG. 1, ports 2 and 3 are placed on either side of a longitudinal plane of symmetry passing through the axis of exhaust port 4, although this layout is not necessary for the invention.

A bypass line 8 is also provided. It opens on the one hand into exhaust pipe 7 via a first port 9 and on the other hand into at least one of intake pipes 5 or 6 via a second port 10. Ports 9 and 10 are preferably located close to combustion chamber 1. Bypass line 8 will be referred to as "EGR pipe" in the description hereafter since it carries exhaust gases from port 9 to port 10, i.e. to intake 6.

Intake 6 into which EGR pipe 8 opens allows chamber 1 to be supplied with air whereas intake 5 allows fuel mixture to be supplied.

EGR pipe 8 is preferably equipped with a flow regulator placed either inside said pipe (shutter 11) or at the level of port 10 where it opens onto the intake side (shutter 11').

A fuel injector 12 opens into pipe 5 preferably close to intake port 2.

According to an embodiment of the invention, the injector can open into a venturi 13 or any other device which increases the velocity of the fluid flowing therethrough in order to provide better spraying.

Figure 5:
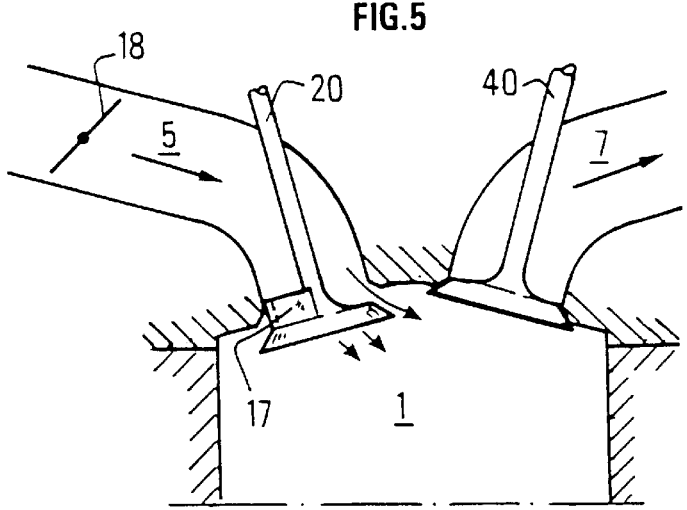
FIG. 5 shows, by means of a simplified longitudinal section, a cylinder of a four-stroke engine according to the invention.

Each one of intake 2, 3 and exhaust ports 4 as illustrated in FIG. 5 is equipped with an opening control such as valves or rotary plugs (bearing reference number 20 for the intake, 40 for the exhaust) which are actuated independently or not according to predetermined opening laws, as explained in detail hereafter.

A compressor 14 can also open into intake pipe 5 so that the fresh feed of the air-fuel mixture is fed into combustion chamber 1 at a pressure slightly above the pressure prevailing in combustion chamber 1.

Figure 2:
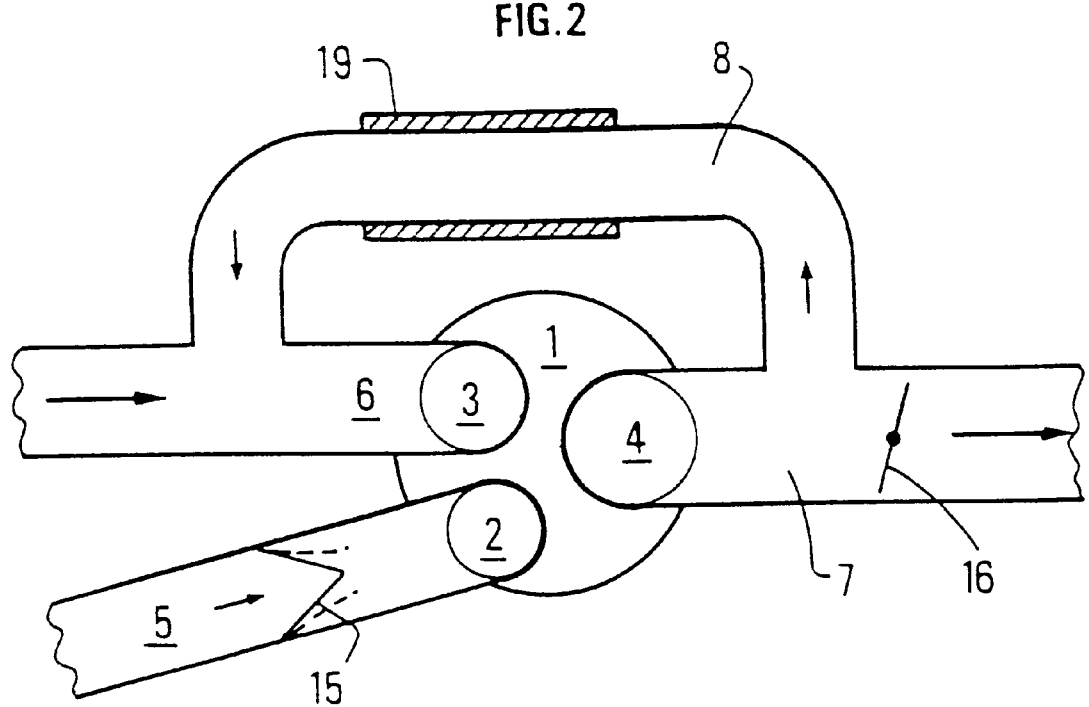
FIG. 2 is a simplified cross-section of a four-stroke engine working according to another embodiment of the invention.

FIG. 2 also shows the main elements of the invention as described in connection with FIG. 1.

It can furthermore be seen that, according to this embodiment of the invention, non-return valves 15 are placed in intake pipe 5. Besides, a flow restriction shutter 16 is placed at the exhaust, just downstream from the branch connection of the EGR.

Valve 15 prevents the fuel mixture from flowing back into intake pipe 5 if the pressure in cylinder 1 is above the pressure in this pipe 5 and the corresponding intake valve 20 is open. As explained hereafter in connection with the operation of the invention, these valves may be unnecessary.

Without departing from the scope of the present invention, EGR pipe 8 can be thermally insulated or even heated by any device 19 known in the art (ceramization, suitable water circuit, . . . ). Insulation can be provided in all or part of pipe 8.

Figure 3:
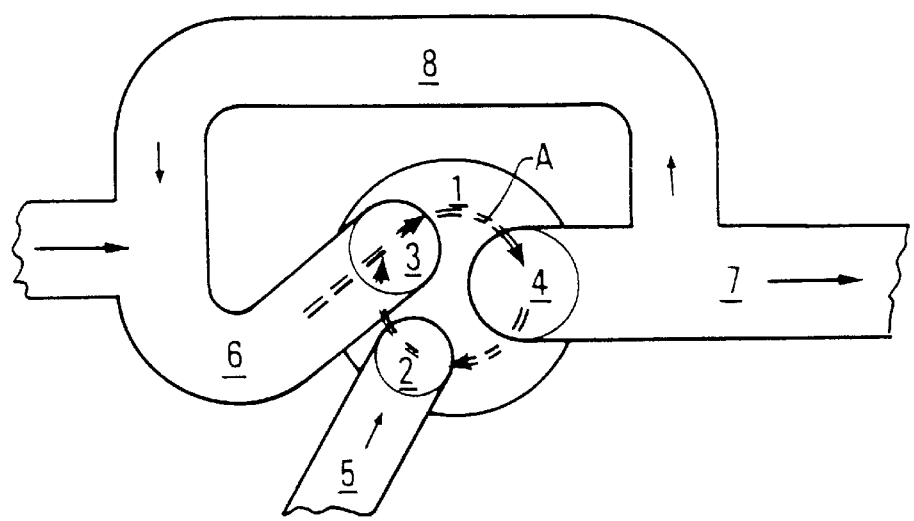
FIG. 3 is a cross-section of a particular method of implementation of the invention.

Another way to improve operation of the invention in accordance with FIG. 3 uses a helical intake pipe 6 in the vicinity of intake port 3 so as to promote a motion referred to as swirl, i.e. a motion of rotation about the principal axis of the cylinder for the recycled EGR gases and the additional air. Double arrows A illustrate this motion.

The EGR will thus be placed on the periphery and at the bottom of combustion chamber 1.

Figure 4:
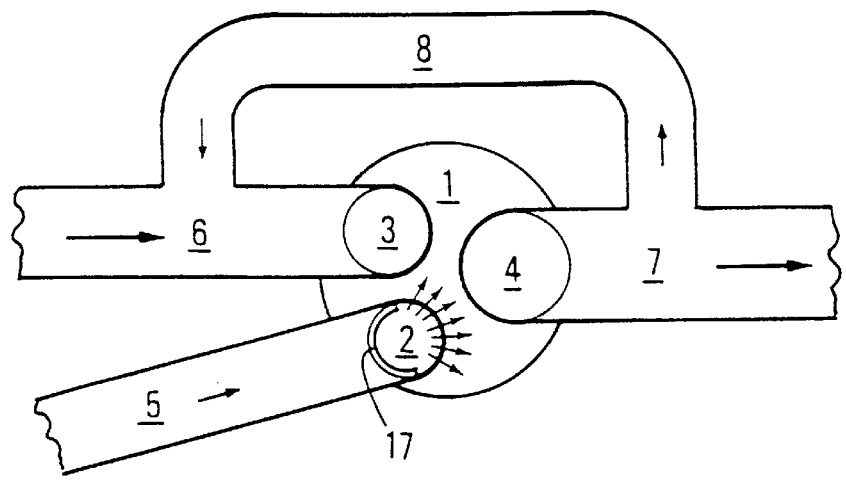
FIG. 4 is a simplified cross-section showing the detail of a specific embodiment of the invention.
Figure 4A:
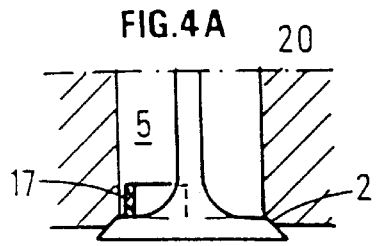
FIGS. 4A and 4B are longitudinal sections of an intake valve according to the invention, respectively in open and closed positions.
Figure 4B:
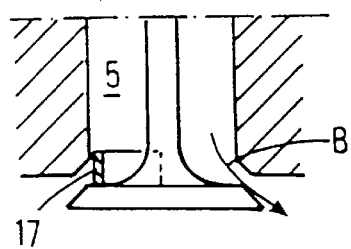

FIG. 4 and FIGS. 4A and 4B illustrate an embodiment of the invention wherein a deflector 17 is fastened to the valve on the fuel mixture intake side. Deflector 17 feeds the fresh mixture into the central zone of combustion chamber 1.

Thus, as illustrated in particular by FIG. 4B, when intake valve 20 is open, deflector 17 allows passage of the gases according to arrow B, i.e. rather towards the center of the combustion chamber and on the cylinder head side.

However, without departing from the scope of the invention, the deflector can be fastened to the valve seat. It can exhibit any suitable shape which diverts the gases towards the center and the top of combustion chamber 1, as shown by arrow B in FIG. 4B.

FIG. 5 illustrates a possible improvement according to the invention. In addition to deflector 17 associated with one of the intake valves, this engine comprises a throttling device 18 placed in fuel mixture intake pipe 5. Throttling device 18 slows the inflow of the fresh fuel feed down in order to minimize the mixing thereof with the other gases in the combustion chamber. French patent 2,693,233 discloses such a throttling device which is however used in another engine type.

The invention, at partial load, confines in the cylinder and in the combustion chamber a large amount of recirculated burned gases (external EGR). Delayed admission of a fresh feed of air-fuel mixture occurs while minimizing as much as possible mixing of the fresh gases and of the EGR, which amounts to introducing the fresh gases when the external EGR is completely trapped and, if possible, as late as possible just before compression. This fresh fuel mixture will preferably be injected with a relatively low velocity and penetration so as to minimize mixing with the burned gases. Penetration and feed rate control can be obtained through a throttling device such as 18 described in connection with FIG. 5.

In other words, what is sought according to the invention is to recycle exhaust gases to the intake via a first intake (not illustrated) and delayed air-fuel mixture supply via a second intake means 20.

The whole process according to the invention can thus comprise the following successive events:
1) a period of admission through at least a first external EGR,
2) after this first admission period, a large amount of burned gases remains confined in the cylinder,
3) thereafter, as late as possible according to the air pressure available for spraying and introducing the fuel, a period of admission of a fresh mixture of air and of fuel under pressure by a second valve 20.

It can be noted that, at high loads, only air can be injected through the first external EGR whereas, when the load decreases, the amount of external EGR increases more and more and eventually only external EGR is admitted via this valve or these valves.

Outside partial loads, the engine must therefore be able to run in a more conventional way, i.e. with increasing overlap between events 1 and 3, event 3 progressing and the external EGR decreasing when the load increases. In particular at full load, a minimum external EGR will be sought, which goes contrary to what is proposed here for partial loads.

Furthermore, at full load, the air under pressure used to spray the fuel can have a slight engine supercharging effect.

Several solutions allowing events 1 to 3 to take place at partial loads are given hereafter by way of non limitative example:

In case of an engine with mechanically cam-actuated valves for example, the opening of valve 20 intended for intake of the mixture of air and fuel under pressure will be greatly delayed at partial load (event 3) and start in the vicinity of or after the closing of the first intake EGR. This delay can be obtained by altering the opening law relative to fuel mixture intake valve 20.

Intake pipe 6 associated with the first valve EGR, which is communicated with exhaust pipe 7, is thus supplied with the maximum amount of burned gases tolerated by the engine, either by a valve 11 placed in EGR pipe 8 or by a shutter 11' placed at the junction of pipes 6 and 8. In cases where the opening law is such that fuel mixture intake valve 20 is still open when the pressure in the cylinder increases (due to compression), a harmful backflow effect can result therefrom and the non-return valve type system 15 described in connection with FIG. 2 can then be used.

In case of an engine provided with fuel mixture intake valves 20 with totally variable opening during the lift and angular position in the cycle (distribution by electromagnetic or electrohydraulic control), it may be more advantageous to open valve 20 as late as possible according to the available pressure (i.e. before the pressure in the cylinder becomes higher than the fuel mixture intake pressure) and for the shortest time possible in order to better separate the fuel mixture intake process from the previous EGR intake process, and therefore to minimize internal mixing. This also allows avoiding the necessity for a non-return system such as 15.

Improvements can be carried out to these two solutions without departing from the scope of the invention. In fact, it may be particularly advantageous to place a throttling device (for example butterfly valve or plug valve such as 16) downstream from exhaust valve(s) 40 so as to increase the external EGR effect (FIG. 2).

Furthermore, without departing from the scope of the invention, rotary plugs can be used instead of the valves in order to obtain the suitable and desired exhaust and/or intake opening laws.

In order to better control the internal aerodynamics and to intensify the stratification effects between the external EGR feed and the fresh fuel feed, and to obtain, at partial loads, conditions favorable to self-ignition, the following complementary solutions can be used:

Supply pipe 6 into which EGR pipe 8 opens can have a helical shape in order to drive the recycled exhaust gases in the direction shown by arrow A in FIG. 3, i.e. on the periphery and on the piston side of combustion chamber 1.

As shown in FIG. 4, pipe 5 intended for the supply of fuel mixture under pressure can comprise a valve 20 provided with a deflector. This deflector can be placed either on valve 20 itself (FIGS. 4A and 4B), or on the seat of valve 20, or come in the form of a masking screen included in the cylinder head (FIG. 5). Whatever their form, these devices must allow the fuel mixture feed to be injected near the center of the combustion chamber and in a vicinity of the ignition device.

As described above, fuel mixture supply pipe 5 can comprise a restriction device 18 intended to slow down the fresh feed inflow into the cylinder so as to minimize mixing. FIG. 5 illustrates this distinctive feature.

Introduction of the fresh air-fuel mixture feed at a pressure slightly above the pressure in the cylinder requires compressed air coming from a pressure source 14: this pressure source can be a compressor (Roots type positive-displacement compressor for example or screw or piston compressor, which may be one of the pistons of the engine itself), driven mechanically or electrically. In this case, the compressed air can even be used for atomization and spraying of the fuel.

Generally speaking, the process according to the invention allows, at partial load, first to fill the engine with a maximum amount of burned gases recycled from the exhaust, then to supercharge it with an air-fuel mixture which thus provides the fresh feed without taking the place of the burned gases, therefore without decreasing the amount thereof.

These conditions are favorable to self-ignition and to the control thereof.

According to the invention, the engine can run conventionally at high loads, with a period of fuel mixture delivery under pressure that can take place simultaneously with the air supply by the valve used for the EGR at low load. Under such conditions, the external EGR and the absence of mixing thereof with the fresh gases are not necessarily sought, and the exhaust and intake periods can allow a certain overlap necessary to obtain a high torque. When an exhaust restriction device 16 is used, it will of course be widely open at high load. The non-return device (valves) 15 preventing backflow of the fuel mixture to the intake should have no negative effects for running at high loads, and introduction of this fuel mixture under pressure can even have a supercharging effect favou9rable to engine performances.

Transition between the conventional working mode at high load and with spark ignition and the partial load mode with controlled self-ignition according to the invention will thus be achieved by varying the parameters used to control the external EGR and the minimum mixing between the external EGR and the fresh fuel mixture, which are:
variation of the external EGR ratio through the (EGR and/or air, according to the load) intake valve by varying opening of the communication with the exhaust, and possibly by suitable calibration of the opening law for this intake valve,
position of exhaust throttling device 16 (if provided),
variation of the opening law for admission of the fuel mixture under pressure.

In cases where variation of these control parameters is not sufficient to obtain self-ignition combustion running, other well-known actions such as heating of the fresh gases admitted can be used additionally. However, it is expected from the invention that, in case it does not allow b itself to reach the controlled self-ignition combustion mode, it allows at least a reduction of the need for complementary actions (for example by reducing the heating level required for the fresh gases).

Finally, without departing from the scope of the invention, the conventional ignition spark can be maintained throughout the controlled self-ignition running.

What is claimed is:

1. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein admission of the mixture of air and fuel occurs at a start of a compression stage of the combustion chamber.

2. A process as claimed in claim 1, wherein admission of the mixture of air and fuel occurs at least as early as an end of the admission of the exhaust gas.

3. A process as claimed in claim 1, wherein recycled gas flow is controlled by a device placed in one of the exhaust recirculation device or at an intersection of the exhaust gas recirculation device with the intake.

4. A process as claimed in claim 1, wherein a flow of air is controlled at the intake so to decrease velocity of air entering the combustion chamber for specific running conditions of the engine.

5. A process as claimed in claim 1, wherein a shape of the exhaust gas recirculation device imparts to the exhaust entering the combustion chamber a motion of rotation about a principal axis of the combustion chamber.

6. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein recycled gas flow is controlled by a device placed in one of the exhaust recirculation device or at an intersection of the exhaust gas recirculation device with the intake.

7. A process as claimed in claim 6, wherein a flow of air is controlled at the intake so to decrease velocity of air entering the combustion chamber for specific running conditions of the engine.

8. A process as claimed in claim 6, wherein a shape of the exhaust gas recirculation device imparts to the exhaust entering the combustion chamber a motion of rotation about a principal axis of the combustion chamber.

9. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein admission of the mixture of air and fuel occurs at least as early as an end of the admission of the exhaust gas and recycled gas flow is controlled by a device placed in one of the exhaust recirculation device or at an intersection of the exhaust gas recirculation device with the intake.

10. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein a flow of air is controlled at the intake so as to decrease velocity of air entering the combustion chamber for specific running conditions of the engine.

11. A process as claimed in claim 10, wherein a shape of the exhaust gas recirculation device imparts to the exhaust entering the combustion chamber a motion of rotation about a principal axis of the combustion chamber.

12. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein admission of the mixture of air and fuel occurs at least as early as an end of the admission of the exhaust gas and a flow of air is controlled at the intake so to decrease velocity of air entering the combustion chamber for specific running conditions.

13. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein a shape of the exhaust gas recirculation device imparts to the exhaust entering the combustion chamber, a motion of rotation about a principal axis of the combustion chamber.

14. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein admission of the mixture of air and fuel occurs at least as early as an end of the admission of the exhaust gas and a shape of the exhaust gas recirculation device imparts to the exhaust entering the combustion chamber a motion of rotation about a principal axis of the combustion chamber.

15. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the air of the mixture of air and fuel is compressed at the intake.

16. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the mixture of air and fuel is sprayed by a venturi placed in the intake.

17. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the air and fuel mixture is diverted to a center of the combustion chamber upon entry into the combustion chamber.

18. A process as claimed in claim 17, wherein the fuel is injected at the venturi.

19. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the exhaust passing through the recirculation device is thermally insulated before entry into the intake.

20. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the mixture of air and fuel is heated when a temperature thereof is below a predetermined value before entering into the combustion chamber.

21. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the flow of exhaust through the recirculation device is controlled.

22. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein the exhaust recirculation device opens at the exhaust downstream from a gas processing device.

23. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein a rotary plug is positioned in at least one of the intake or exhaust to control flow of gas therein.

24. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein a valve controls the flow of gas through at least one of the intake or exhaust.

25. A method of operation of a four-stroke internal combustion engine having an intake, a combustion chamber coupled to the intake, an exhaust coupled to the combustion chamber and an exhaust recirculation device connecting the exhaust to the intake comprising:

admitting exhaust gas into the combustion chamber which is recirculated by the recirculation device from the exhaust into the intake;

thereafter admitting through the intake into the combustion chamber a mixture of air and fuel to be combusted which produces a stratification in the combustion chamber of the mixture of air and fuel and the exhaust gas; and self-igniting the stratified contents of the combustion chamber; and wherein a non-return valve in the intake prevents backflow in the intake of part of the mixture of air and fuel.

26. A method of operation of a four-stroke internal combustion engine having first and second intakes, a combustion chamber coupled to the intakes, an exhaust coupled to the combustion chamber and an exhaust recirculation device connecting the exhaust to the first intake comprising:

admitting exhaust gas into the combustion chamber which is recirculated by the recirculation device from the exhaust into the first intake;

thereafter admitting through the second intake into the combustion chamber a mixture of air and fuel to be combusted which produces a stratification in the combustion chamber of the mixture of air and fuel and the exhaust gas; and self-igniting the stratified contents of the combustion chamber.

27. A process as claimed in claim 26, wherein admission of the mixture of air and fuel occurs at least as early as an end of the admission of the exhaust gas.

* * * * *